March 28, 1961  A. O. DOWNS, JR  2,976,855
COMBUSTION APPARATUS FOR LOW HEAT VALUE FUEL
Filed Oct. 8, 1957  3 Sheets-Sheet 1

INVENTOR.
Albert O. Downs, Jr.
BY
ATTORNEY

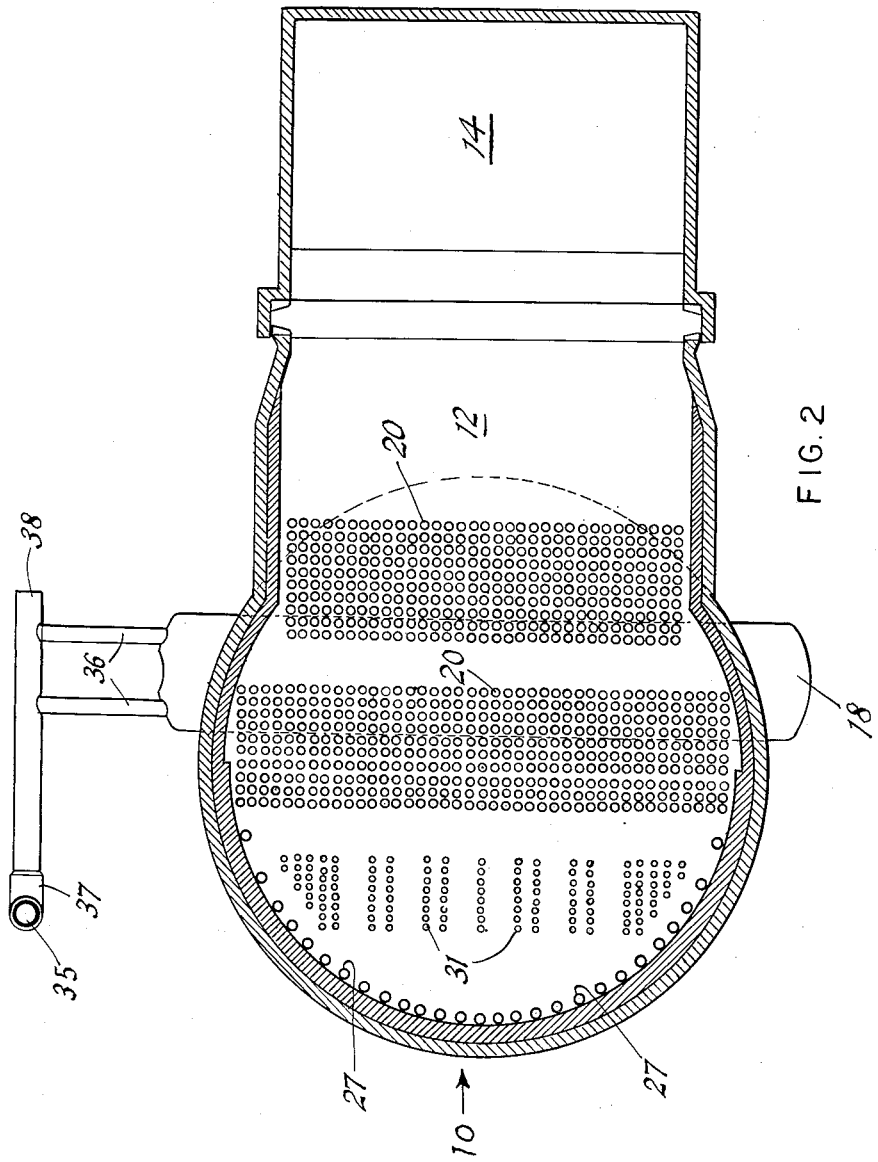

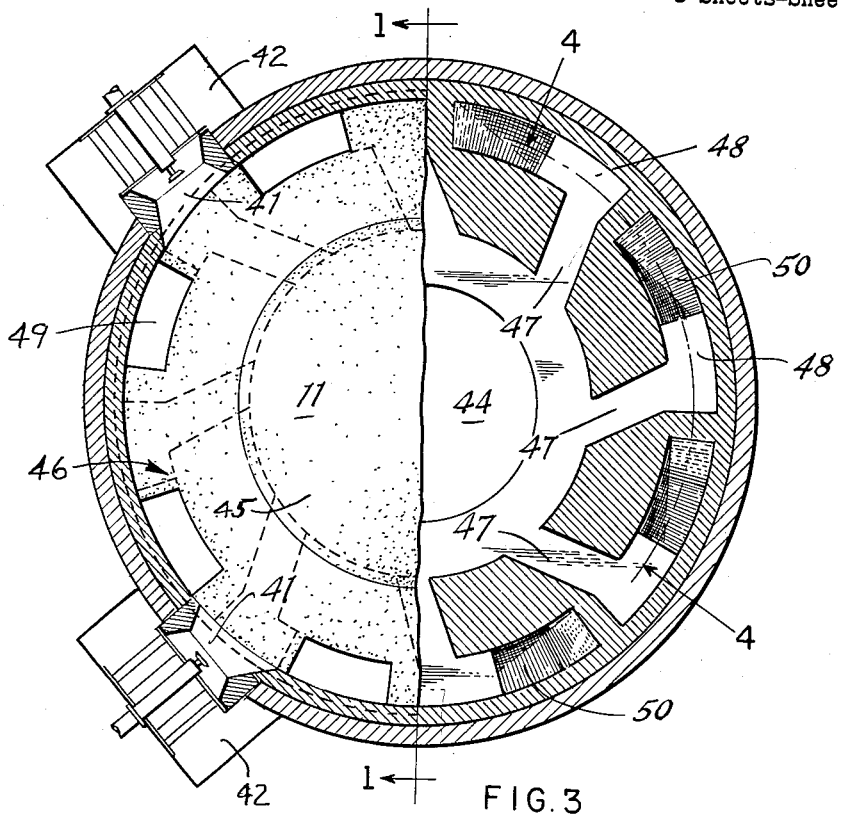
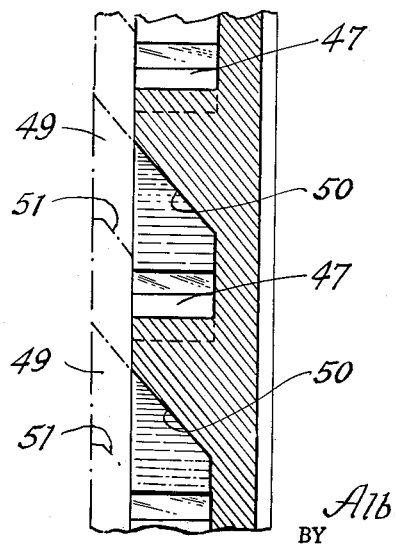

2,976,855
Patented Mar. 28, 1961

2,976,855

COMBUSTION APPARATUS FOR LOW HEAT VALUE FUEL

Albert O. Downs, Jr., Lynbrook, N.Y., assignor to The Babcock & Wilcox Company, New York, N.Y., a corporation of New Jersey Filed Oct. 8, 1957, Ser. No. 688,856

4 Claims. (Cl. 122—7)

The present invention relates to combustion apparatus and more particularly to apparatus for burning a low heat value fuel for heat exchange purposes.

During the catalytic refining of petroleum the catalyst becomes coated with carbon, loses its effectiveness as a catalyst and must be reactivated or regenerated for effective reuse in petroleum processing. The regeneration of the catalyst involves the introduction of oxygen containing gases into a hot bed of the carbon coated catalyst to burn the carbon. The gases resulting from catalyst regeneration ordinarily contain a small percentage of carbon monoxide, some hydrocarbons, and oxygen in addition to large volumes of inert gases such as carbon dioxide, nitrogen and water vapor. A typical heat value of the gases passing from a catalyst regenerator lies in the range of from 15 to 25 B.t.u.'s per cubic foot (standard temperature and pressure) of gas, with the gases having a considerable amount of sensible heat available at a temperature of the order of 1000° F. or higher.

The gases obtained from a catalyst regenerator ordinarily cannot be burned under self-sustaining combustion conditions due to the low heat content thereof. Such gases, however, can be burned when the gas temperatures are maintained in the range of 1500 to 1600° F. Gas ignition temperatures are attained by the use of a supplementary high heat valve fuel, such as natural gas, fuel oil, or the like which is burned in a furnace to raise the temperature of the low heat value gas to ignition temperatures and to mix the products of combustion from both fuels.

In accordance with my present invention I provide a combustion chamber or furnace wherein a high heat value fuel is introduced to an intermediate portion of the furnace so that the radiant heat emitted during the combustion of the fuel aids in igniting the low heat value fuel which is separately introduced into the lower portion of the furnace. Advantageously, the low heat value gaseous fuel is introduced into the bottom of the furnace in such a manner as to be heated to its ignition temperature and burned. This is accomplished by introducing the low heat valve fuel through the bottom of the furnace with vertical and horizontal components of motion for upward movement of the gases adjacent the wall of the furnace with the result that the low heat value gases are heated and intimately mixed with the combustion products of high heat value fuel in the intermediate portion of the furnace so that all of the combustible constituents in both fuels attain intimate contact with the oxygen necessary for combustion, while above their ignition temperature.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

Fig. 2 is a section taken on the line 2—2 of Fig. 1;

Fig. 3 is a section taken on the line 3—3 of Fig. 1; and

Fig. 4 is a section taken on the line 4—4 of Fig. 3.

Figure 1:
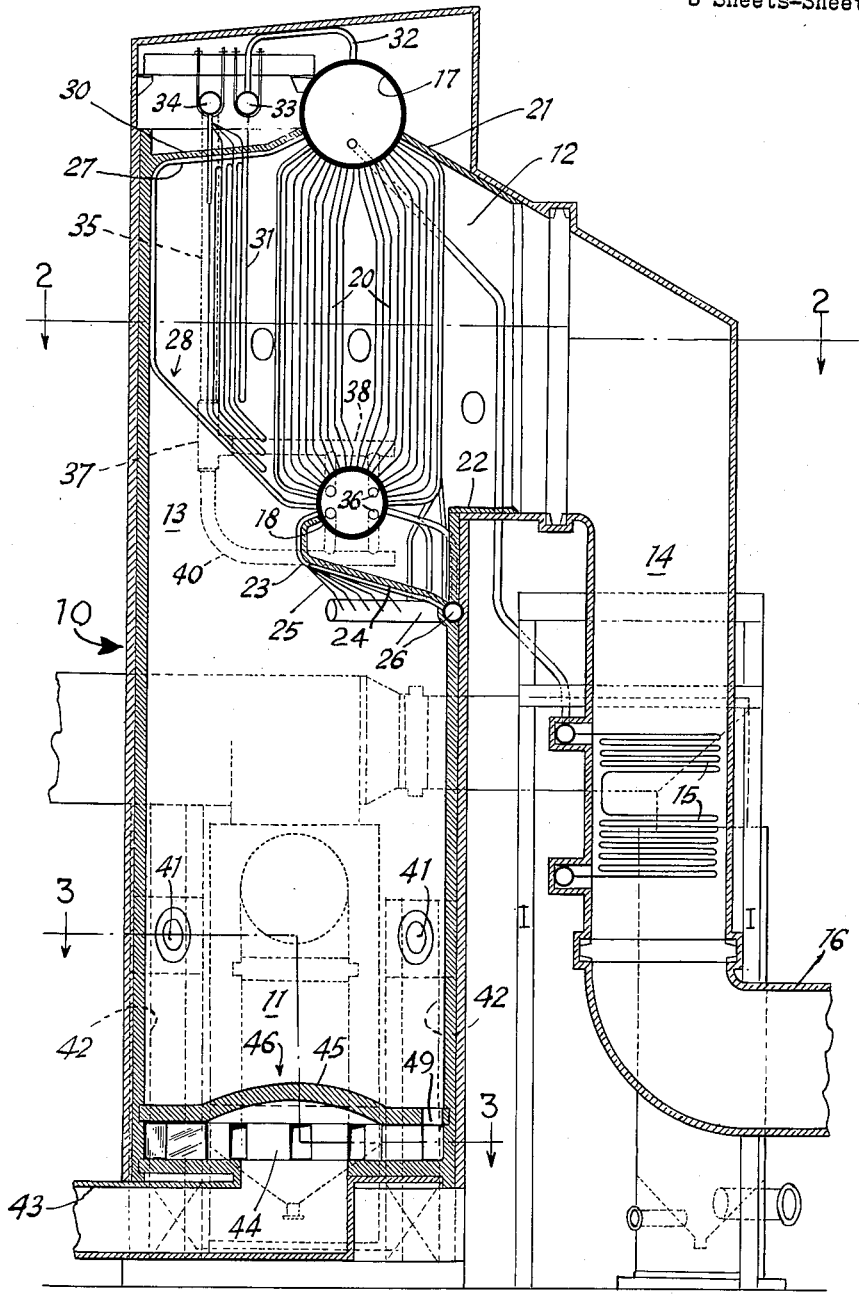
Fig. 1 is an elevation, in section, of a vapor generating and superheating unit constructed in accordance with the present invention.

While the invention is illustrated as applied to the generation and superheating of vapor by heat exchange with the gases of combustion obtained in burning gases resulting from the regeneration of a catalyst, it will be understood that the invention is also applicable to the burning of other low heat content gases which are not capable of self-sustaining combustion and require an elevated temperature for ignition. Likewise, the hot gases of combustion produced by fuel combustion can be used for purposes other than vapor generation and superheating.

As shown, the invention includes an elongated cylindrical furnace setting 10 having provisions for burning fuel in the lower portion 11 and having a heating gas outlet 12 in the upper portion thereof. As hereinafter described, the fuel burning provisions are arranged for the efficient and complete combustion of a low heat value fuel incapable of self-sustaining combustion, in concert with a high heat value fuel which is burned to insure the combustion of the low heat value fuel. If desired, the high heat value fuel can be burned alone. This procedure may be desirable as, for example, when the low heat value or otherwise waste gas is not available and heating gases are required for vapor generating purposes.

As shown particularly in Figs. 1 and 2, the upper portion 13 of the cylindrical furnace setting 10 is provided with a vapor generating and superheating unit which is positioned adjacent the gas outlet 12 of the setting. The gas outlet is formed in one side of the cylindrical wall of the upper portion of the furnace setting for the discharge of spent heating gases in a horizontal direction toward a downwardly disposed substantially vertical convection gas pass 14. Advantageously, economize elements 15 are provided in the convection gas pass 14 with the gases thereafter discharged through a flue gas duct 16 from the lower end portion of the gas pass 14. The gases of combustion can be discharged to atmosphere through a stack (not shown).

The vapor generating unit includes vertically spaced horizontally positioned drums 17 and 18 which are connected by rows of vapor generating tubes 20 forming a heat exchange bank which is positioned generally within the cylindrical wall of the furnace 10 with a minor portion of the heat exchange surfaces of the tubes 20 extending into the gas outlet 12. The upper drum 17 of the vapor generating unit is positioned substantially in the roof 21 of the furnace setting while the lower drum 18 is downwardly spaced at a position substantially in a horizontal alignment with the lower boundary wall 22 of the gas outlet 12.

A gas deflecting baffle 23 extends inwardly of the furnace setting 10 from the cylindrical wall downwardly spaced from the boundary wall 22 of the gas outlet 12. The baffle 23 is formed of refractory material having an upwardly inclined lower surface 24, and is provided with a row of vapor generating tubes 25 to support the baffle and to cool it from the hot gases rising in the furnace. The row of tubes 25 lining the baffle are supplied with water from a generally U-shaped manifold 26 which receives water from the lower drum 18. A row of tubes 27 extends towards the opposite wall of the furnace from the lower drum 18 to form a screen 28 with the upper end portions of the tube row shaped to line the upper portion 13 of the forward segment of the furnace 10. Thereafter, the tubes extend across the face of the roof 30 and open into the upper drum 17. As shown in Fig. 1, pendent rows of multi-loop tubular elements form a superheater 31 which is positioned in the cavity between the screen row of tubes 27 and the forward row of vapor generating tubes in the bank 20 connecting the upper and lower drums 17 and 18, respectively. As shown in Fig. 1, saturated steam from the upper drum 17 is discharged through a row of tubes 32 to the superheater inlet header 33 so as to supply saturated steam to the superheater. The superheated steam flows into a superheated steam outlet header 34 which is connected by a large diameter superheated steam pipe 35 with a submerged attemperator 36 positioned in the lower drum 18 of the unit.

In the construction shown, the upper end portions of both the inlet and outlet sections of the superheater tubes project upwardly through the roof 30 of the unit to the superheater inlet and outlet headers 33 and 34, respectively. Thus, the headers are positioned out of the flow path of the heating gases and the superheater discharge pipe 35 is likewise positioned out of the flow path of the heating gases.

As is customary with submerged attemperators, the superheated steam is controlled as to its flow division so that a selected portion of the superheated steam may be delivered to the submerged attemperator while another selected portion of the superheated steam bypasses the attemperator. The proportioning of steam flow is regulated by a valve 37 which receives the superheated steam from the pipe 35 which with a selected portion of the steam passing through a pipe 38 to the attemperator while another selected portion of the steam passes through another branch pipe 40 to bypass the attemperator. Thereafter, both streams of superheated steam are combined for discharge to a point or points of use. With the arrangement described, the temperature of the superheated steam discharged from the unit may be closely controlled for most efficient utilization of the steam.

As shown in Fig. 1, the lower portion 11 of the furnace 10 is provided with a horizontally disposed circumferentially equally spaced series of fuel burner ports 41. The ports are spaced above the bottom of the furnace and are provided with means for the admission of fuel, such as oil or gas (not shown) and combustion air to the furnace. The burner ports 41 are supplied with a controlled quantity of combustion air through upright ducts 42 which are connected with a common source of superatmospheric pressure air such as a blower or a forced draft fan (not shown).

In accordance with the invention, the bottom of the furnace 10 is provided with a series of gas ports 49 for introducing the low heat value gaseous fuel which is discharged through the bottom of the furnace in a plurality of circumferentially distributed streams which have horizontal and vertical components of motion. The low heat value gaseous fuel is supplied from an outside source such as a catalyst regenerator or kiln (not shown) through a refractory lined duct 43 which discharges upwardly into a plenum chamber 44 centrally positioned beneath a domed portion 45 of the furnace bottom 46. As shown particularly in Figs. 3 and 4, the plenum chamber is provided with a plurality of circumferentially uniformly spaced passageways 47 which are horizontally oriented in a non-radial direction. The non-radial passageways discharge into individual chambers 48 having substantially the same cross-sectional flow area as the passageways with the chambers 48 each having an upwardly inclined bottom surface 50 which cooperates with an upwardly inclined parallel positioned top surface 51 so as to discharge the gases in a stream helically along the inner adjoining surface of the cylindrical wall of the furnace 10.

In the illustrated embodiment of the invention, the gases are the product of a catalyst regeneration process and have a substantially high sensible heat upon delivery to the furnace 10. Temperatures of the order of 1000° F., and more, are usual. The gases may have a B.t.u. value of from 15 to 25 B.t.u.'s per cubic foot, for example, and are delivered in such volumes that the velocity of discharge from the port openings in the bottom of the furnace may be of the order of 6000 to 7000 feet per minute. The swirling mass of low heat value gas rises in the furnace, generally following the circumferential wall of the furnace. As the gases rise, they are heated by radiation from the combustion of the high heat value fuel introduced through the ports 41 and are mixed with the products of combustion from the high heat value fuel. The combination of increased temperature of the gases, as obtained from radiation heating, and the intimate mixing with the burning high heat value fuel, leads to the combustion of the combustible portions of the gas. Ordinarily, sufficient high heat value fuel is burned to increase the temperature of the low heat value fuel to a value of 1400 to 1600° F. The combustion of the combined fuels leads to a mixture temperature of 1600 to 1700° F. as the gases rise in the furnace. In rising, the gases are mixed by the initial swirl of the low heat content fuel and are deflected toward one side of the furnace unit by the baffle 23. Thereafter, the hot gases pass over the heat exchange surfaces of the vapor generator and the superheater to produce superheated steam for the production of electricity or for processing purposes.

While in accordance with the provision of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Apparatus for burning fuel which comprises walls defining an upright furnace, burner means positioned in the wall and intermediate the height of said furnace for the introduction of high heat value fuel, and fuel inlet means in the bottom of said furnace for the introduction of low heat value fuel into said furnace, said fuel inlet means being positioned adjacent the inner surface of said furnace wall, and means for discharging said fuel initially upwardly through said inlet means parallel to the furnace wall including walls defining fuel flow passageways each opening to a corresponding fuel inlet means, each passageway having a circumferential portion with an upwardly inclined lower surface beneath said inlet means.

2. Apparatus for burning fuel in suspension which comprises walls defining an upright furnace, burner means positioned in the wall and intermediate the height of said furnace for the introduction of high heat content fuel, and means defining a plurality of low heat content fuel ports in the bottom of said furnace for the introduction of gaseous fuel into said furnace, said fuel ports being circumferentially spaced adjacent the inner surface of said furnace wall, and means for discharging fuel upwardly through each of said ports with a component of motion generally parallel with respect to the adjacent furnace wall including a distribution chamber positioned beneath the bottom of said furnace to receive said gaseous fuel, walls defining a gaseous fuel flow passageway having a portion leading from said distribution chamber to a position circumferentially spaced from each of said ports, and a circumferential portion of each of said passageways connected with said portion and having an upwardly inclined lower surface opening to the corresponding fuel port.

3. Apparatus for burning fuel in suspension which comprises walls defining an upright furnace of horizontal circular cross-section, burner means positioned in the wall and intermediate the height of said furnace for the introduction of high heat content fuel, and means defining a plurality of low heat content fuel ports in the bottom of said furnace for the introduction of gaseous fuel into said furnace, said fuel ports being circumferentially spaced adjacent the inner surface of said furnace wall, and means for discharging fuel upwardly through each of said ports with a component of motion generally parallel with respect to the adjacent furnace wall including a distribution chamber positioned beneath the bottom of said furnace to receive said gaseous fuel, walls defining a gaseous fuel flow passageway having a non-radial portion leading from said distribution chamber to a position circumferentially spaced from each of said ports, and a circumferential portion of each of said passageways connected with said non-radial portion and having an upwardly inclined lower surface opening to the corresponding fuel port.

4. In fluid heating apparatus, the combination comprising walls defining a cylindrical furnace having a heating gas outlet in the upper portion thereof, heat exchange means positioned in the upper portion of said furnace including vertically spaced fluid containing drums connected by generally upright tubular members extending in spaced relation across said furnace adjacent said heating gas outlet, fluid cooled baffle means extending partially across said cylindrical furnace from a position spaced below said heating gas outlet, burner means positioned in the walls and intermediate the height of said furnace for the introduction of high heat value fuel and combustion air thereto, and fuel inlet means in the bottom of said furnace for the introduction of low heat value gaseous fuel into said furnace, said fuel inlet ports being positioned in the bottom of said furnace and circumferentially spaced adjacent the inner surface of said furnace wall, and means for discharging fuel upwardly through said inlet ports with a component of motion generally parallel with respect to the adjoining wall of said furnace including a distribution chamber centrally positioned below the bottom of said furnace to receive said low heat value gaseous fuel, walls defining a passageway leading from said distribution chamber to each of said inlet ports, said passageway having a circumferential portion beneath the corresponding inlet port and with a lower surface inclined upwardly to open to said inlet port.

References Cited in the file of this patent

UNITED STATES PATENTS

| 901,232 | Eldred | Oct. 13, 1908 |
| 1,830,324 | LaMont | Nov. 3, 1931 |
| 2,686,500 | Hauck | Aug. 17, 1954 |
| 2,840,049 | Durham | June 24, 1958 |

FOREIGN PATENTS

| 246,955 | Great Britain | Feb. 11, 1926 |